(12) United States Patent
Hallstrom et al.

(10) Patent No.: US 6,450,753 B1
(45) Date of Patent: Sep. 17, 2002

(54) CARGO TRANSFER SYSTEM

(76) Inventors: Olof A. Hallstrom, 1900 Hallstrom Rd., Tillamook, OR (US) 97141; Kevin M. Pike, 19602 SW. Derby Ct., West Linn, OR (US) 97068; Donald W. Wilton, 18006 SE. 280th Pl., Kent, WA (US) 98042

( * ) Notice: Subject to any disclaimer, the term of this patent is extended or adjusted under 35 U.S.C. 154(b) by 0 days.

(21) Appl. No.: 09/753,402

(22) Filed: Jan. 3, 2001

(51) Int. Cl.[7] .......................... B65G 63/00; B65G 65/00
(52) U.S. Cl. ........................ 414/400; 414/396; 414/401
(58) Field of Search ................ 414/395, 396, 414/400, 401, 345, 500

(56) References Cited

U.S. PATENT DOCUMENTS

| | | | | |
|---|---|---|---|---|
| 2,105,391 A | * | 1/1938 | Almdale | 173/126 |
| 3,397,802 A | * | 8/1968 | Hinchee | 104/134 |
| 4,016,991 A | * | 4/1977 | Oldford | 214/38 C |
| 4,088,008 A | * | 5/1978 | Whatling et al. | 279/76 |
| 4,203,697 A | * | 5/1980 | Cayton | 414/345 |
| 4,589,813 A | * | 5/1986 | Hagen et al. | 414/401 |
| 5,054,987 A | * | 10/1991 | Thornton | 414/390 |
| 5,454,682 A | * | 10/1995 | Alexander | 414/401 |
| 5,588,522 A | * | 12/1996 | Foster et al. | 198/775 |
| 5,875,920 A | * | 3/1999 | Parent | 222/1 |
| 6,065,923 A | * | 5/2000 | Foster | 414/401 |

\* cited by examiner

Primary Examiner—Eileen D. Lillis
Assistant Examiner—Charles A Fox
(74) Attorney, Agent, or Firm—Olson & Olson (57) ABSTRACT

A cargo transfer system provides a transport trailer floor with a plurality of guide tracks that slidably support a floor platform having substantially the same dimensions as the full size cargo floor of the trailer; a similar plurality of support guide tracks being provided in a shipping/receiving facility arranged for axial and elevational alignment with the guide tracks of a transport trailer positioned in the loading/unloading bay of the facility. A powered drive mechanism associated with the guide tracks in the facility releasably engages a floor platform member to push or pull the floor platform member along the aligned guide tracks between the transport trailer and the facility whereby to load or unload the entire contents of transport trailers in a single movement of the floor platform therebetween.

6 Claims, 5 Drawing Sheets

CARGO TRANSFER SYSTEM

BACKGROUND OF THE INVENTION

This invention relates to the loading and unloading of cargo transport trailers, and more particularly to a system arranged for the expedited and simplified loading and unloading operations of the entire cargo contents of trailers, vans and other transport containers without the necessary involvement of forklift operations and other complex moving floor systems heretofore necessary or available.

Presently, most cargo is transferred on small pallets placed within trailers using motorized forklifts. This is time consuming and results in much damage to the trailers. It is therefore desirable to eliminate the use of forklifts entering the trailer and instead have loading and unloading done within a plant or warehouse.

Systems have been provided heretofore in attempts to eliminate the aforementioned loading and unloading operations. However, they all require the trailer to be fitted with a conveyor system either of chains, belts or reciprocating slats or cables and associated high cost required for each transport trailer. In operation, the trailer conveyor is synchronized with a stationary table with a similar conveyor, and palletized goods are then transferred from the trailer conveyor to the in-plant conveyor. These work well for special applications, but are limited in their use and are expensive and troublesome.

SUMMARY OF THE INVENTION

In its basic concept, the cargo transfer system of this invention provides a movable transport floor platform configured as a full sized floor of a cargo transport trailer or other transport vehicle and supported above the floor of a trailer by elongated support guide bearing rails which allow the platform to be moved into and out of the trailer off of and onto corresponding support guide bearing rails positioned in a plant or warehouse facility by a drive mechanism in the facility which releasably engages the platform and pushes or pulls it along the respective support guide bearing rails.

It is by virtue of the foregoing basic concept that the principal objective of this invention is achieved; namely, the provision of a cargo transfer system by which the entire contents of a cargo transport trailer can be quickly loaded and unloaded as a unit with minimal modification to new or existing transport trailers and shipping and receiving facilities in order to accommodate the system.

Another object and advantage of this invention is the provision of a cargo transfer system of the class described which allows cargo to be of any form or shape and eliminates the need of cargo being placed on conventional pallets.

Another object and advantage of this invention is the provision of a cargo transfer system of the class described which allows the in-plant portion of the system to utilize the floor platform member as a part of the inplant distribution system.

A further object and advantage of this invention is the provision of a cargo transfer system of the class described which eliminates the need for any expensive conveyor mechanism or powered drive mechanism located within transport vehicles.

A yet further object and advantage of this invention is the provision of a cargo transfer system of the class described which permits trailers equipped with this system to utilize the floor platform member as a conventional cargo floor for loading and unloading in conventional manner at sites not equipped with the corresponding elements of this system.

A still further object and advantage of this invention is the provision of a cargo transfer system of the class described which is economical to manufacture and install in both transport trailers and in shipping and receiving facilities.

The foregoing and other objects and advantages of the cargo transfer system of this invention will appear from the following detailed description taken in connection with the accompanying drawings of a preferred embodiment.

DESCRIPTION OF THE PREFERRED EMBODIMENT

Figure 1:
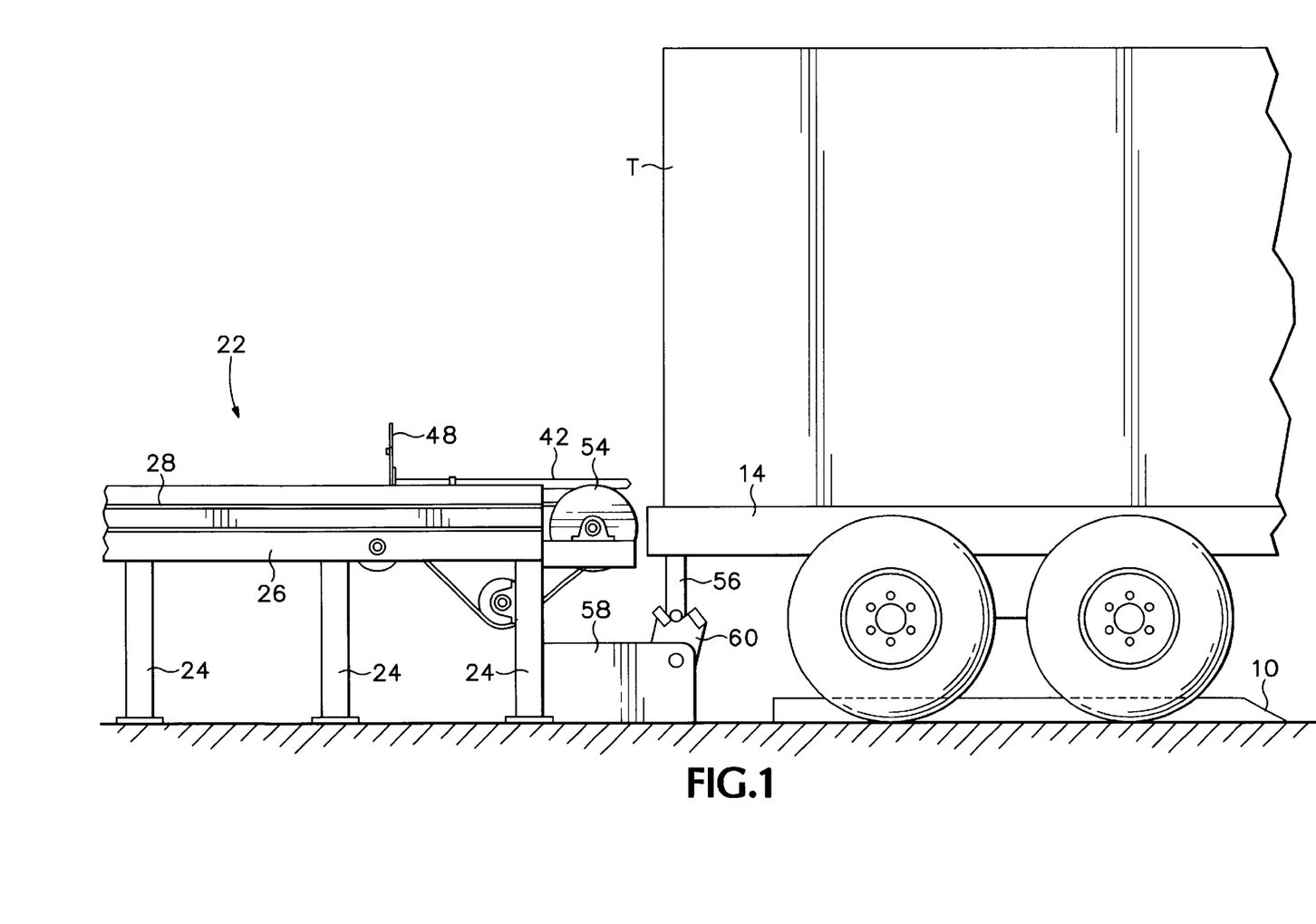
FIG. 1 is a fragmentary side elevation of a cargo transfer system embodying features of this invention, the system shown in condition for unloading a transport trailer positioned and secured in condition for loading and unloading.

The drawings illustrate a cargo transfer system embodying features of this invention, FIG. 1 showing the in-plant portion of the system in an initial condition with a transport trailer T backed into a captured and secured loading and unloading condition for operation of the system to unload the entire contents of the trailer. As illustrated, the system preferably includes trailer positioning means, such as tire guides 10, for guiding the trailer into a proper position within a loading bay of a shipping and receiving facility, as will be understood. Positioned thusly, a trailer is oriented in a loading and unloading bay of a plant or warehouse for proper alignment and operation of the interrelated components of the cargo transfer system to be described herein.

Figure 2:
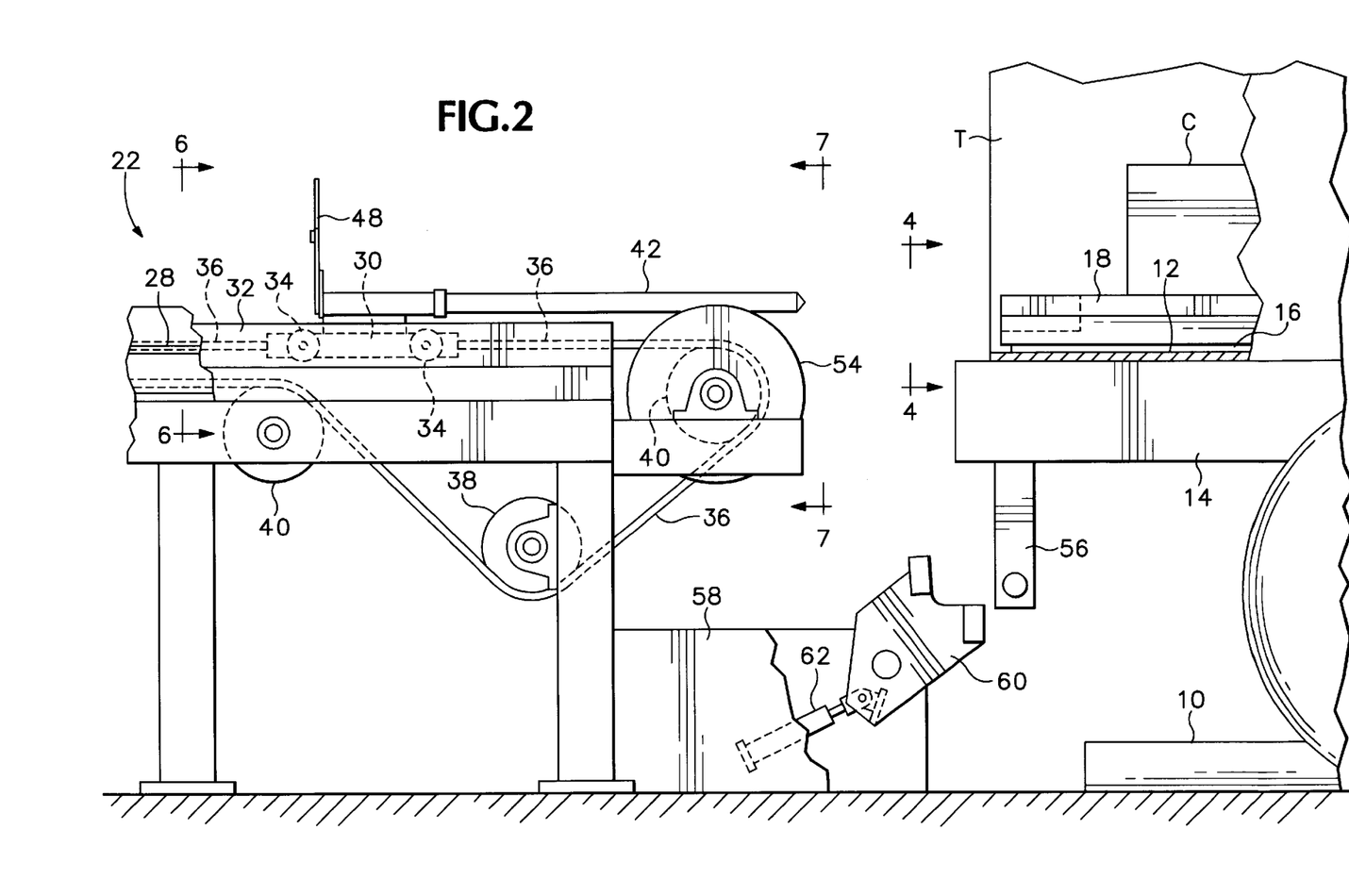
FIG. 2 is a fragmentary side elevation on an enlarged scale of the system of FIG. 1 showing a transport trailer being backed into position prior to securement of the trailer.

First, with reference to FIG. 2 of the drawings, a transport trailer T includes a floor cargo bed 12 extending the full width and length of the trailer interior, the trailer box and floor all supported on a trailer frame 14, as is well known. Typically, the floor directly supports cargo C carried on pallets delivered thereto and therefrom by forklift truck in conventional loading and unloading operations. The cargo transfer system of this invention includes a trailer-mounted assembly which utilizes the trailer floor 12 structure for the mounting of a plurality of elongated guide bearing rail members 16 (best seen in FIG. 4) spaced laterally apart across the floor and preferably configured to extend substantially the entire length of the trailer floor from front to back.

As illustrated, the guide bearing rail members are preferably configured in the basic track rail form shown wherein an upper bearing surface 16' is provided on supporting rail mounting members 16 for sliding support thereon of a floor platform member 18 above the floor 12 of the trailer. Alternatively of course the guide bearing rail members may be configured to provide a roller bearing surface (not shown) if desired. Any suitable bearing surface configuration may be used in conjunction with the elongated guide bearing rail members 16 as may be desired or needed for satisfactory support of the movable floor platform member now to be described.

Figure 3:
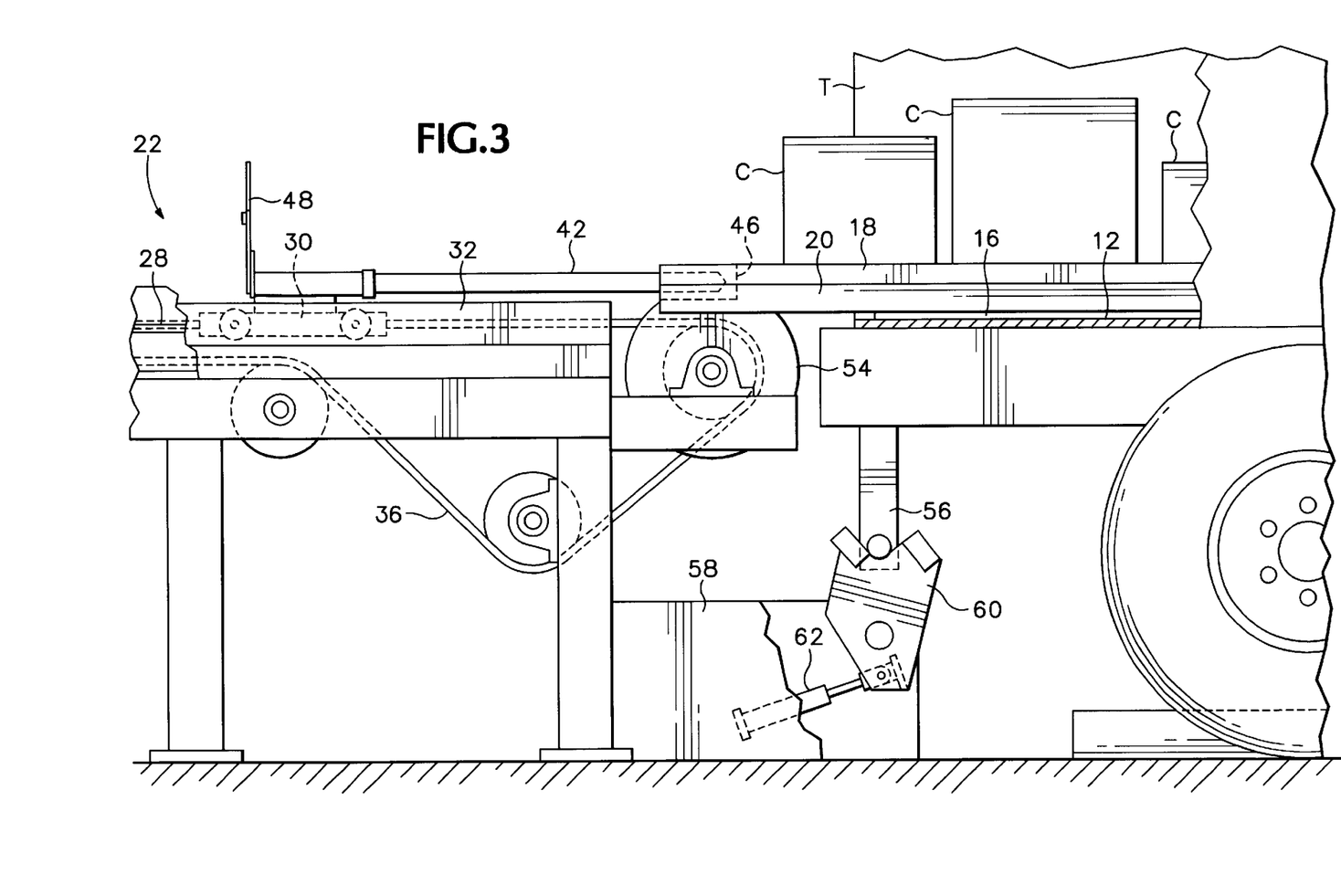
FIG. 3 is a fragmentary side elevation on the system of FIG. 2 after engagement and activation of the trailer securing apparatus and partial removal of the cargo supporting floor platform member of this invention.
Figure 4:
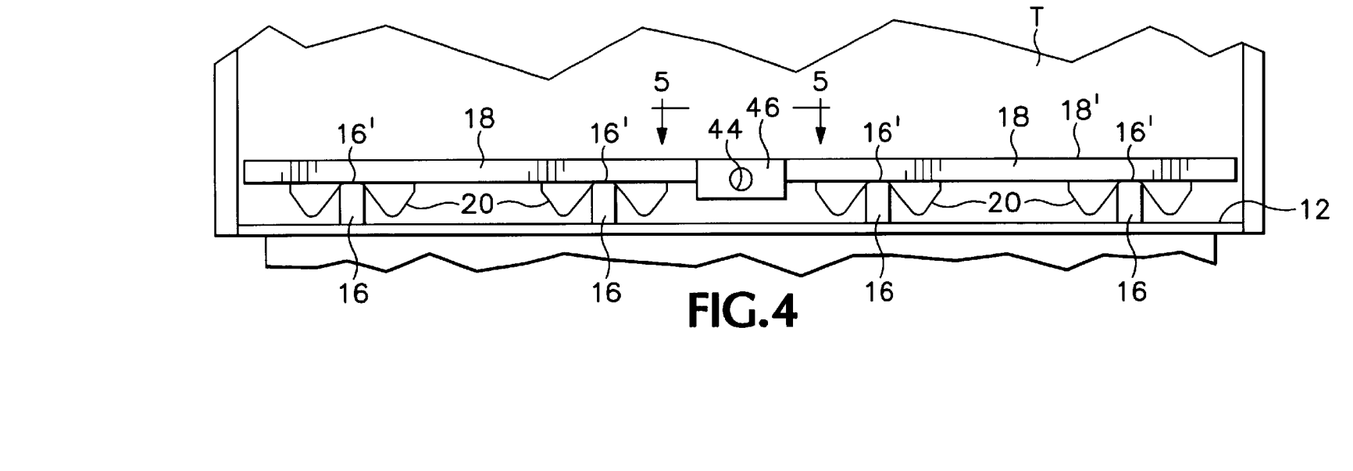
FIG. 4 is a fragmentary end view looking into the back of the transport trailer at the floor platform member supported on its guide bearing rail members, the view taken along the line 4—4 in FIG. 2.

As seen in FIGS. 2, 3 and 4 of the drawings, a movable floor platform member 18 is provided for support on the guide bearing rail members 16 and configured with an upper cargo supporting surface 18' that is dimensioned with substantially the same width and length as the floor 12 of the trailer. In this manner, the floor platform 18 provides a substantially second full size trailer floor removably supported slightly above the fixed floor 12 of the transport trailer or van.

As seen best in FIG. 4 the underside of the floor platform member mounts plastic guard rail guide bearing members 20 configured to cooperate with the guide bearing rail members 16 to permit longitudinal movement of the floor platform member therealong. The guard rail guide members 20 are particularly configured, as shown, to provide guard rail stop means for assuring constant and positive aligned positioning of the platform member supported on the guide bearing rails 16. More particularly, the guard rail guide members 20 insure against lateral displacement of the platform member therefrom as well as against any lateral wandering of the moving floor platform member thereon, as will become clear.

As will be understood in viewing FIG. 4, the floor platform member 18 is thus 20 entirely prevented from any lateral shifting movement within the trailer during road transport by virtue of the guard rail guide members 20, and further the platform member is prevented from any lateral wandering movement on the guide bearing rails when the platform is being moved therealong as will be explained. This arrangement also provides for consistent proper alignment of the floor platform member into and out of any transport trailer equipped for the system of this invention.

With the foregoing trailer-carried components of the system thus described, attention will now be turned to the facility-mounted apparatus of the cargo transfer system of this invention. As shown in FIGS. 1, 2 and 3, an elongated table assembly 22 is fixed in place at the entrance of a loading and unloading bay of a shipping and receiving facility. As will be appreciated the table assembly is positioned substantially centrally at the entrance to the bay in order that it be oriented centrally relative to transport trailers and vans backed thereto and guided into proper position in the bay by tire guides 10. As is apparent, the table assembly 22 includes a plurality of fixed leg members 24 supporting a horizontal support frame 26 a predetermined distance above the supporting floor of the facility, said predetermined distance corresponding generally to the height of a trailer floor 12 above the facility floor. The horizontal top frame 26 mounts a plurality of second, elongated guide bearing rail members 28 extending longitudinally and spaced laterally across the support frame 26 corresponding in spacing to the first guide bearing rail members 16 mounted on the floor 12 of a transport trailer. In this manner it will be apparent that with a trailer properly positioned in the bay, the first and second plurality of longitudinally elongated guide bearing rail members 16, 28 are in end-to-end precise axial alignment for reciprocal movement of a floor platform member 18 thereon between table assembly and trailer, as indicated in FIG. 3.

The table assembly 22 also mounts power drive means for releasably engaging a floor platform member 18 and moving it longitudinally on the guide bearing rail members 16, 28 from table assembly to trailer and from trailer to table assembly. In the embodiment illustrated, this drive means comprises a carriage assembly 30 carried in a supporting guide channel housing 32 that extends the length of the table along its center line. Bearing wheel members 34 on the carriage assure free but captured movement of the carriage assembly within the channel housing. A drive chain 36 is connected at one of its ends to the front of the carriage and extends forwardly through the channel to the front end of the table and thence to the back end of the table and into the rear end of the channel whereupon the opposite end of the chain is connected to the rear of the carriage assembly 30. Drive sprockets 38 and other necessary sprockets are of course provided for the purpose of driving the chain 36 in opposite directions to move the carriage assembly forward and back in its confining channel housing the full length of the table assembly 22.

The carriage assembly includes means for releasably engaging a floor platform member 18 disposed on the guide bearing rail members 16, 28 and moving the floor platform member therebetween by the movement of the carriage assembly. In the preferred embodiment illustrated, this platform engaging means is provided as an elongated, forwardly projecting spear member 42 mounted on the carriage member 30 for forward extension therefrom at a predetermined height above the table. This predetermined height is arranged to correspond with and align with a port opening 44 on the floor platform member 18 carried on the guide bearing rail members 16, 28; the port opening providing entrance of the forward terminal end of the spear member into a receiver assembly 46 on the platform member as seen best in FIGS. 4, 5 and 5a of the drawings.

With reference still to the spear member 42, in the illustrated form of the invention shown in the drawings, the spear member is mounted to the carriage member for rotation of the spear about its longitudinal axis by handle assembly 48 (FIGS. 1–3). The forward end portion of the spear includes a notch portion 50 (seen in FIGS. 5 and 5a) that is moved by rotation of the spear by the handle assembly 48 between first and second positions as will become clear from the following explanation of FIGS. 5 and 5a of the drawings.

Figure 5:
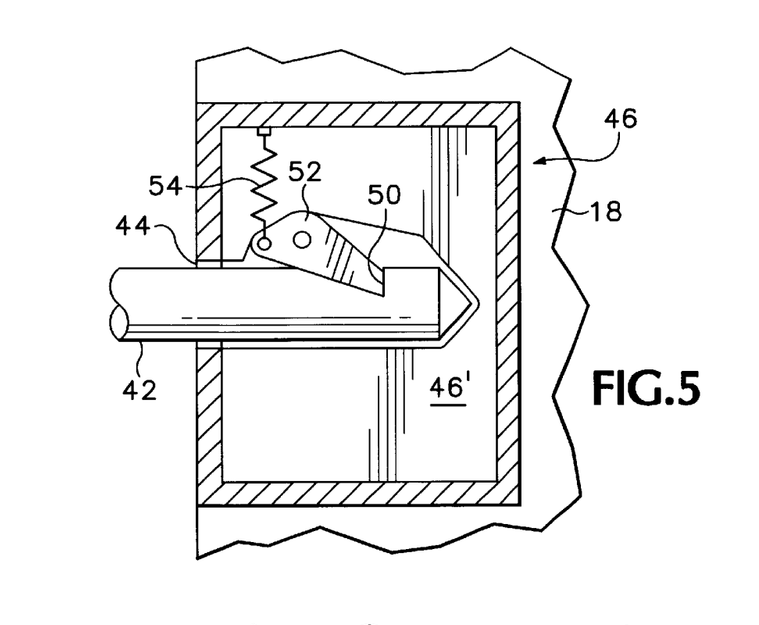
FIGS. 5 and 5a are fragmentary sectional views of the locking arrangement associated with the floor platform member and corresponding drive mechanism of the system, taken along the line 5—5 in FIG. 4.
Figure 5A:
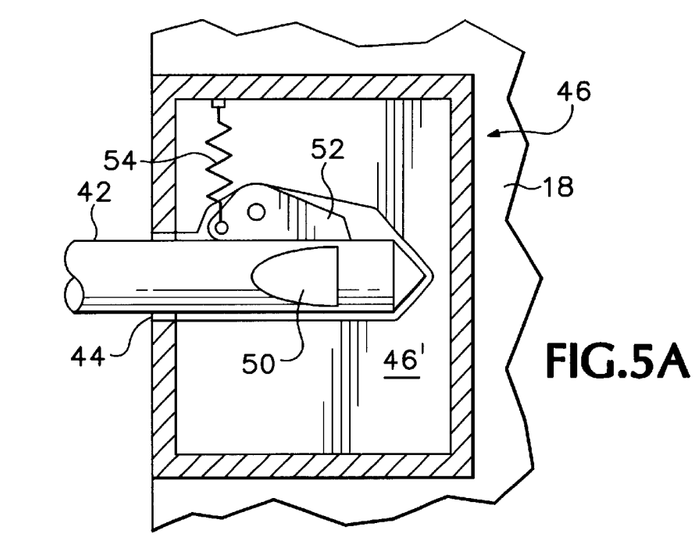
Figure 6:
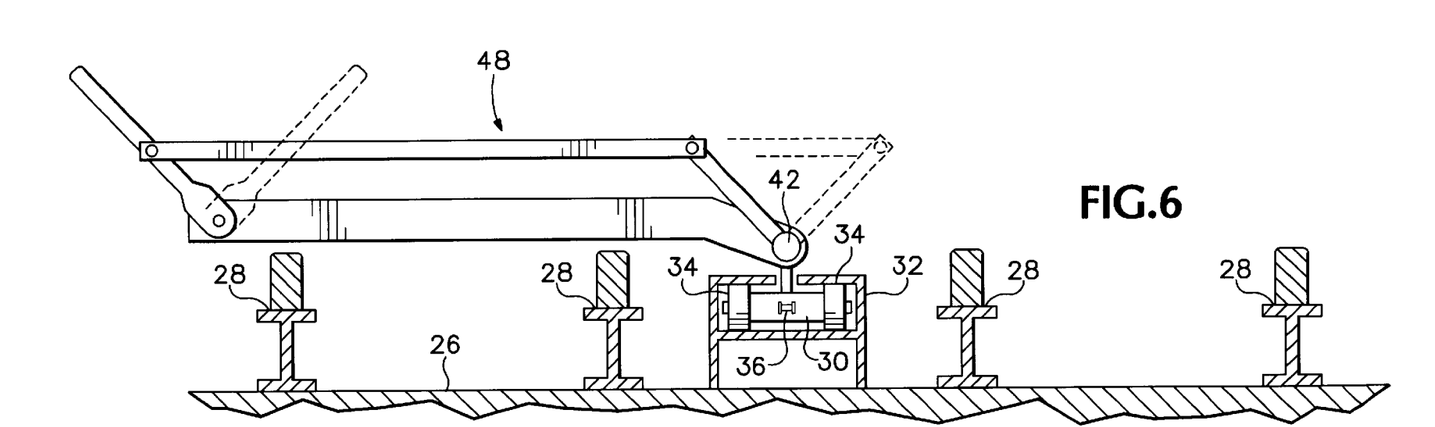
FIG. 6 is a sectional view through the in-plant guide bearing support table taken along the line 6—6 in FIG. 2.
Figure 7:
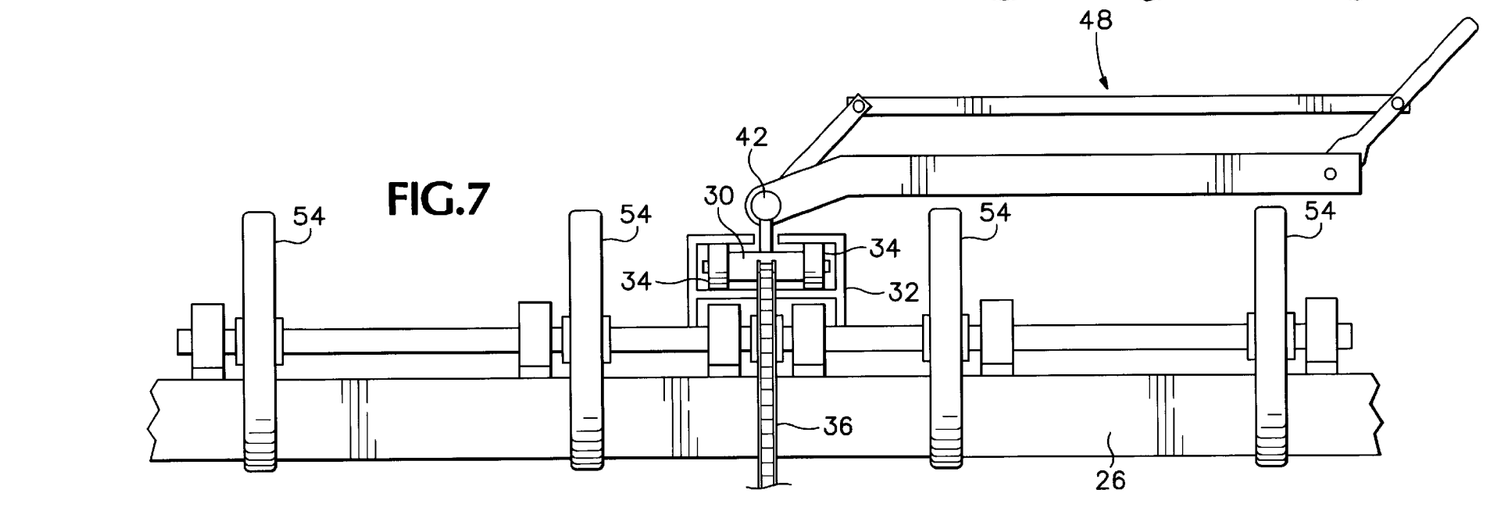
FIG. 7 is an end view of the in-plant guide bearing support table taken along the line 7—7 in FIG. 2.

Referring now to FIGS. 5 and 5a, it is seen that the receiver assembly 46 on the platform member 18 receives the terminal end portion of the spear member 42 through port opening 44 in either position of rotational orientation of the spear as determined by the handle assembly 48. As illustrated, the receiver assembly 46 includes a pivoted lever catch member 52 that is biased by spring 54 toward a normally intercepting condition relative to the port 44 as will be apparent in viewing FIG. 5. In this manner when spear member 42 is inserted into the receiver 46 by movement of the carriage assembly 30 to the forward end portion of the table 22, the lever catch member 52 is pivoted by abutment against the spear into spring-tensioned engagement against the confronting side surface of the spear member.

As will be apparent to those skilled in the art, if the spear member 42 is rotated by the handle assembly 48 into its first position of FIG. 5 in which the notch 50 is oriented toward the lever catch member 52, the lever catch member 52 will engage in the notch 50 in the spear and effectively secure the spear member to the platform member 18 within the receiver assembly. In this secured condition, hereinafter referred to as an unloading condition of engagement, rearward retracting movement of the carriage assembly 30 will effect pulling action on the platform member by virtue of its locked engagement with the spear 42 through lever catch 52, and effectively pull the platform member from a transport trailer or van to the in-plant table assembly 22. Thus the unloading of the entire contents of a transport trailer or van is accomplished. Conversely of course, with the spear member rotated into the loading condition of FIG. 5*a* by the handle assembly 48, the spear is allowed to enter the receiver assembly through port 44 and therein abut the rear confronting wall 46' of the receiver assembly to push a loaded or unloaded floor platform member 18 forwardly along the guide bearing rail members 26 of the table and onto the guide bearing rail members 16 in a trailer to load the trailer in that single operation. Simple reversal of the carriage movement retracts the spear from the receiver as is apparent in FIG. 5*a*.

As illustrated in the drawings, a plurality of spaced apart guide wheels 54 are preferably provided at the front of the table assembly, each aligned with a corresponding laterally spaced guide bearing rail member 16, 28. The wheels, together with the guard rail guide members 20 facilitate proper aligned transfer of a floor platform member 18 from trailer guide bearing rail members 16 to corresponding table-mounted guide bearing rail members 28 and back. These wheels also accommodate for variations in relative height differences that may be present between the corresponding guide bearing rail members 16, 28. These wheels 54 may be powered or non-powered as desired or needed.

In the preferred form of the invention illustrated herein the table assembly 22 preferably includes means for engaging and securing a transport trailer thereto in positive, captured and secured condition in which the trailer-mounted guide bearing rail members 16 are most advantageously aligned with the in-plant, table-mounted guide bearing rail members 28 for unhindered transfer of cargo-laden floor platform members therebetween. In this regard, the trailer is provided with a frame rail assembly 56 configured for corresponding engagement by facility-mounted capture unit 58 configured to engage a trailer to position and secure it immovably relative to the table assembly for optimum performance of the cargo transfer system.

In the embodiment illustrated, a pivotal vehicle capture member 60 powered in desired manner, as by hydraulic cylinder members 62 shown, is configured to engage a vehicle frame rail assembly 56 and move it distally and/or elevationally relative to the table assembly 22 to position and firmly secure a vehicle immovably in position in the loading and unloading bay of a facility. This assures that the guide bearing rail members 16, 28 are in proper axial and elevational alignment relative to each other for transfer of the floor platform member 18 therebetween while preventing undesirable movement of the secured vehicle consequent of the loading and unloading process, as will be appreciated from FIG. 3 of the drawings.

With the foregoing components and basic structural elements of this invention thus described, the operation of the cargo transfer system of this invention is as follows:

A cargo transport vehicle is backed into a loading and unloading bay of a facility guided by tire guides 10 into precise, proper position therein until the frame rail member 56 of the transport vehicle engages the trailer capture member 60, as will be understood in FIG. 2 of the drawings. The vehicle capture apparatus 60, 62 is operated, as shown in FIG. 3 of the drawings, to positively engage the frame rail member 56 of a transport trailer to positively and securely lock the trailer immovably in condition for operation of the system. The cargo trailer doors are opened, and the handle member 48 is moved into its unloading condition which orients the notch 50 on the spear member 42 for automatic engagement with the latch member 52 in the receiver of the floor platform member 18, as seen in FIG. 5. The drive means is operated to drive the carriage member 30 and its associated spear member 42 forward along the table 22 until forward terminal end of the spear member enters the receiver assembly 46 in the floor platform member 18 and engages therein as shown in FIG. 5. The drive means is then operated in the reverse direction to move the carriage rearwardly along the table along the floor platform member 18 secured thereto by the spear member 42, pulling the loaded floor platform member from the interior of the trailer onto the in-plant table assembly 22, thereby emptying the entire contents of the trailer carried on the full-size floor platform member 18.

Thus emptied of its load, the trailer may be driven to another bay and secured in place for loading of an empty or pre-loaded floor platform member in the following manner: With an empty trailer backed into position and secured in place at a loading bay and with an empty or loaded floor platform member positioned on the table assembly 22, the handle member 48 is rotated into its loading position and the drive mechanism operated to move the carriage forwardly to engage the terminal end of the spear 42 in the receiver of the floor platform member as seen in FIG. 5*a* of the drawings. The drive mechanism is operated to continue moving the carriage forwardly along the table, pushing the loaded or unloaded floor platform member 18 therealong and onto the guide bearing rail members 16 disposed within the transport trailer. When the floor platform member is moved fully into the confines of the transport trailer, the drive mechanism is operated in the reverse direction to withdraw the spear from the floor platform member receiver, the cargo trailer doors are then closed, and the trailer securement apparatus 60, 62 operated to release the trailer which is then driven away.

From the foregoing it will be apparent to those skilled in the art that many changes other than those already described hereinbefore may be made in the size, shape, type, number and arrangement of parts described hereinbefore without departing from the spirit of this invention and the scope of the appended claims.

Having thus described our invention and the manner in which it may be used, we claim:

1. A cargo transfer system for the transfer of cargo between a transport vehicle and a shipping/receiving facility for the loading and unloading of transport trailers, vans and other transport vehicles, the cargo transfer system comprising:

a) first transport vehicle-mounted support guide means configured for fixed mounting on the cargo floor bed of a transport vehicle and to extend substantially the entire length of the cargo floor bed of a transport vehicle for guiding supported cargo onto and off of said transport vehicle, b) second facility-mounted support guide means mounted on said facility at a loading and unloading bay of a shipping/receiving facility, the second support guide means corresponding with said first transport vehicle-mounted support guide means for aligned axial extension therewith in a loading and unloading bay for cargo transfer, c) a movable floor platform member configured with an upper cargo-support surface dimensioned substantially as a full size cargo floor of a transport vehicle, the floor platform member further configured for guided support on and longitudinal movement along said corresponding first and second support guide means, d) platform drive means on said facility for releasably engaging a floor platform member to respectively push and pull it longitudinally along said first and second support guide means into and out of a transport vehicle positioned in a loading and unloading bay of a shipping/receiving facility, whereby e) the entire cargo contents of a transport vehicle carried on the full size floor platform member may be loaded and unloaded between facility and transport vehicle as a unit.

2. The cargo transfer system of claim 1 including transport vehicle capture means associated with said facility for engaging and securing a transport vehicle immovably in position in which said first and second support guide means are maintained in axial alignment relative to each other and for securing a transport vehicle against movement during loading and unloading of the floor platform member onto and from the transport vehicle.

3. The cargo transfer system of claim 1 including guard means on the underside of the floor platform member for engaging at least one of said first and second support guide means to maintain the floor platform member in guided, confined engagement with said first and second support guide means during movement of the floor platform member therealong and for preventing any lateral displacement and wandering movement of the floor platform member supported on the first and second support guide means.

4. The cargo transfer system of claim 1 wherein said platform drive means includes a forwardly projecting spear member configured to releasably engage a receiver member on the floor platform member to selectively push and pull the floor platform member on activation of the platform drive means to drive the spear member forwardly and rearwardly along the associated second support guide means.

5. The cargo transfer system of claim 4 wherein said spear member includes an engagement notch adjacent the forward terminal end thereof and the spear member is arranged for rotational movement between first and second positions, said receiver member is configured with a latch member arranged to engage said notch in the spear when the latter is rotated into one of said positions for securing the terminal end of the spear against removal from the receiver whereby upon activation of the platform drive means in its rearward direction along the associated second support guide means the floor platform member is pulled therewith by virtue of the engagement of the latch member and notch in the receiver member.

6. The cargo transfer system of claim 5 wherein with said spear member rotated into the other of said positions, the notch on the spear member is positioned out of engagement with the latch member of the receiver member, whereupon activation of the platform drive means in its forward direction moves the terminal end of the spear into said receiver to push the platform member along the associated support guide means, and operation of the drive means in its rearward direction retracts the spear from the receiver member without engagement with said latch member.

* * * * *

UNITED STATES PATENT AND TRADEMARK OFFICE
CERTIFICATE OF CORRECTION

PATENT NO.     : 6,450,753 B1                                    Page 1 of 1
DATED          : September 17, 2002
INVENTOR(S)    : Olof A. Hallstrom et al.

It is certified that error appears in the above-identified patent and that said Letters Patent is hereby corrected as shown below:

Column 3,
Line 32, "platform member 18 is thus 20" should read -- platform member 18 is thus --.

Signed and Sealed this

Thirty-first Day of December, 2002

JAMES E. ROGAN
*Director of the United States Patent and Trademark Office*